UNITED STATES PATENT OFFICE.

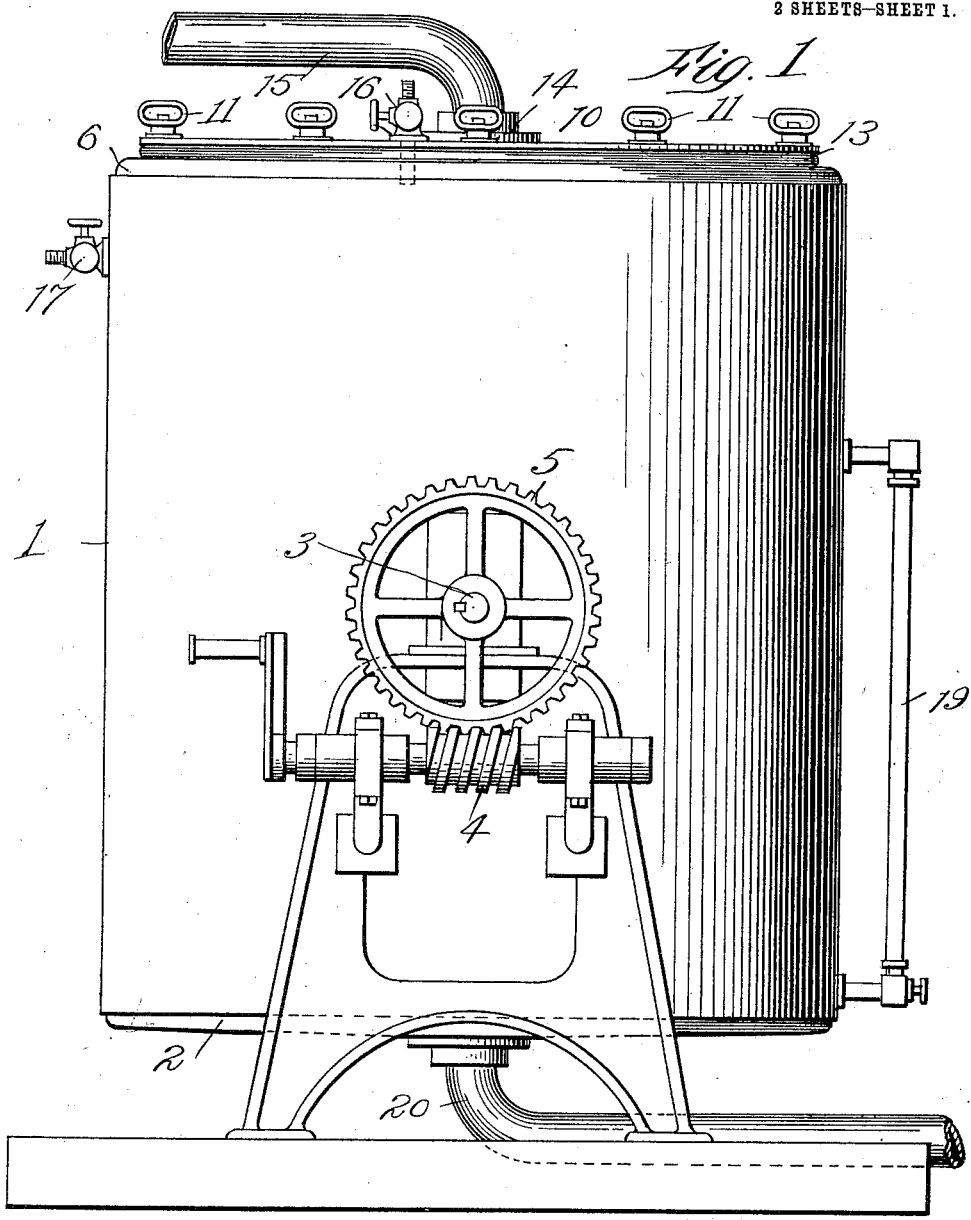
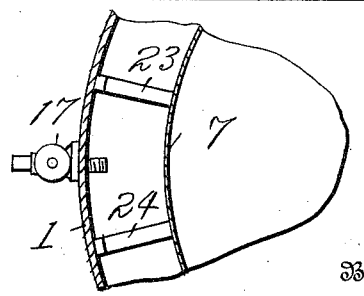

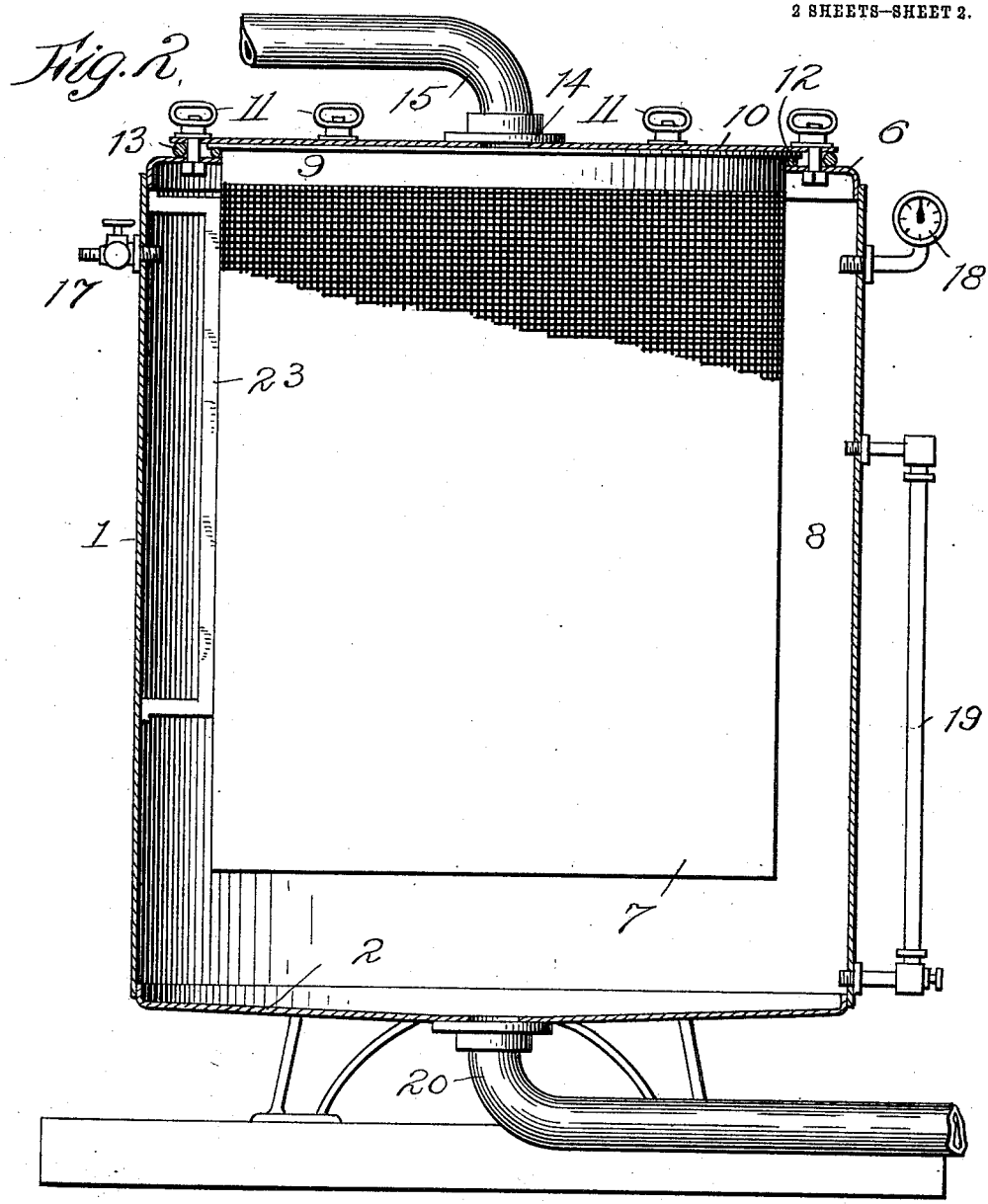

ERNST UHLMANN, OF ALBANY, NEW YORK.

BEER-MAKING APPARATUS.

998,815. Specification of Letters Patent. Patented July 25, 1911.

Application filed October 28, 1909. Serial No. 525,088.

*To all whom it may concern:*

Be it known that I, ERNST UHLMANN, a citizen of the United States, and a resident of Albany, county of Albany, State of New York, have invented new and useful Improvements in Beer-Making Apparatus; and in order that those skilled in the art may understand and practice my invention I give the following specification.

My invention relates to that portion of the beer making art wherein the wort is treated with hops, and it has for its objects to provide an apparatus for preventing the wort from acquiring an objectionable color and flavor and from a tendency to sour as a result of such treatment.

Heretofore, it has been the practice to run the wort from the kettle, wherein it has been treated with hops, into a tank in which it was allowed to stand for a time in order to permit the hops, albuminoids and other suspended matter to settle so that the clear wort could be drawn off to the coolers. This has the objections, that, during this period, the wort is cooling and remains in contact with the hops after the desirable principles have already been extracted therefrom in the kettle, whereas the hops should be immediately separated from the wort after such extraction, since, if left in the cooling wort, particularly for a longer period than about fifteen minutes, the wort acquires an objectionable dark color and a rank bitter taste. Also, as the hops after the wort has been drawn off by the methods heretofore known and used still contain a considerable quantity of wort, it has been the practice, in the effort to remove all the wort, to sparge or wash the hops and squeeze out this residue by means of various styles of mechanical presses or by air pressure. These expedients, however, also impart, even in greater degree, an objectionable color and rank bitter taste from substances embodied in the partly cooled wort and longest in contact with the hops. Further, the wort, after leaving the brewing kettle, must be rapidly cooled, since if allowed to cool slowly, acid fermentation is likely to set in resulting in a souring of the beer.

My invention is designed to overcome these objections and to provide a form of apparatus for rapidly removing the hops from the wort, which shall be simple in construction and operation and require much less floor space for accommodation than apparatus commonly used for the purpose.

In carrying out my invention I remove the hops, albuminoids, and such matter from the wort while the latter is flowing from the brewing kettle to the coolers, so that the wort is freed from these matters almost immediately it leaves the brewing kettle, and does not remain in contact with the hops, etc., longer than a few seconds. Also I remove all the wort from the hops without employment of any mechanical or air pressure.

A form of apparatus embodying my invention is illustrated in the accompaying drawings, in which—

Figure 1 represents a view in elevation. Fig. 2 represents a vertical sectional view. Figs. 3 and 4 represent details of construction.

The same reference numerals are applied to corresponding features in the several views of the drawings.

The apparatus comprises an outer shell or casing 1 which may be of any desired shape, preferably cylindrical, and formed of or lined with copper or other material inert to the beer or wort. The bottom 2 of the shell 1 is preferably dished in shape in order to facilitate drainage or removal of the contents. Secured on opposite sides of this shell are trunnions 3 for mounting in suitable bearings (not shown) in order that by the application of suitable mechanical devices such as worm 4 and worm wheel gear 5, the vessel may be tilted or reversed to give access to its interior or for the purpose of cleaning. At its upper end the shell 1 is provided with an inwardly extending flange 6 to form a support for the cage or strainer 7. This cage or strainer preferably conforms substantially in shape to the shell 1 but is of smaller dimensions throughout so that when in place in the casing a space 8 is left around said strainer 7 between it and the casing 1. The strainer 7 may be made of suitable wire mesh as shown in Fig. 1, or of foraminated material as illustrated in Fig. 3 of a texture suitable for properly straining the beer or wort, by retaining the hops and other solid material and allowing the clear liquid to pass through. At its upper end the strainer 7 is provided with a rim or flange 9 by which it is supported on the flange 6 of the shell.

A cover 10 is provided for the shell which is removably clamped upon the top thereof to the flange 6 by clamping devices 11. Gaskets 12 and 13 are provided between the cover 10, the rim 9 and the flange 6 to insure tight joints. The cover is provided with a central opening provided with a threaded collar 14 to which a pipe or connection 15 is attached. This pipe is coupled by a suitable coupling to the pipe or outlet from the beer kettle. The cover 9 is also provided with an outlet valve 16, the purpose of which will be hereinafter explained. The shell 1 is also provided near its upper end and just beneath the flange 4, with an outlet valve 17 the purpose of which will also be explained below. A pressure gage 18 is also connected with the upper part of the shell to indicate the pressure within the same; and a water gage 19 is also provided to indicate the level of the contents of the apparatus.

At its bottom the shell 1 is provided with an outlet 20 which may be connected by any suitable coupling with the pipe leading to the cooling system or apparatus (not shown).

When it is desired to clean the apparatus, it may be turned to a horizontal position on its trunnions, after uncoupling the pipe connections, the cover removed and the cage or strainer 7 may be withdrawn. To support the cage or strainer when the vessel is in horizontal position, there are provided two inner ribs 23, 24 on which the lower part of the cage rests and along which it may be slid. The valve 17 is preferably placed between these ribs which serve as a protection or fender for the valve.

The operation of the device is as follows: The strainer 7 is inserted in place in the vessel 1 and the cover clamped on. The pipe leading from the beer kettle is then coupled to the pipe connection in the cover 10. The beer or wort is then admitted to the apparatus through the cover, care being taken first to open the outlet valves 16 and 17. The strainer 7 will first become filled with hot liquid, the contained air at the same time being driven out through valve 16. When the liquid commences to come out at this valve the strainer is full and freed from air, and the valve is thereupon closed. The wort rapidly strains through from the inner cage or strainer to the outer space 8, forcing the air therein out through valve 17 in the outer shell. As soon as the liquid commences to escape through this valve the same is closed and the whole apparatus is then filled with liquid and free from air. There will be a short interval between the closing of the two valves. A continuous flow is maintained from the beer kettle through the apparatus to the cooler, the strained beer of wort passing through the discharge outlet in the bottom of the shell 1 to the cooler. The liquid gage 19 will indicate the level of the beer or wort in the space 8.

The outlet valves 16 and 17, provided in the cover and shell of my apparatus, form an important feature of my invention since it has been found that the air in the apparatus, when the wort is admitted if not removed or discharged, accumulates about the top of the vessel, becomes compressed and obstructs the flow of the wort into and through the same; this compressed air causing a back pressure against the flow of the liquid into the vessel, and also a pressure on the contents of the apparatus thereby hindering the rapid separation of the wort. A further objection is that under these conditions the hops float or rise to the surface of the liquid, and obstruct the straining surfaces, further preventing free and rapid straining of the wort from the hops. To prevent these objectionable conditions occurring, I have provided the valves 16 and 17 referred to. These are opened until all the air contained in the vessel has been discharged or removed, whereupon they are closed and the inflow and outflow of the wort through the vessel regulated to give a continuous flow of the liquid through the same. As a result there is a constant downward movement or pressure of the wort in the apparatus which acts to keep down the hops and solid material at the bottom of the strainer, leaving the surfaces thereof free and clear of obstruction so that the wort rapidly passes therethrough and is separated from the hops rapidly and in a minimum of time. The continual free downward movement or flow of the wort through the strainer and from there to the outer shell or space 8 exercises a pressure on the hops retained in the strainer which corresponds to the head or difference of height between the kettle and the apparatus herein shown, (or to the pressure of the pump, where one is employed, to deliver the mingled wort and hops to the apparatus); which pressure so presses out the hops that the customary sparging, as well as the use of mechanical or air pressure commonly resorted to to free hops from the wort, can be dispensed with. The valves 16 and 17 being near the upper part of the shell also serve as connections to which may be attached steam or water pipes for washing out and cleaning the apparatus in a rapid and efficient manner.

By the construction illustrated and described, it will be seen that the apparatus is simple in structure and readily taken apart for repair or thorough cleaning, and, in combination with the beer kettle and cooling apparatus, provides a rapid means for removing the hops, albuminoids, and any solid matters from the wort, without delaying the cooling and without the use of pressure devices, whereby the beer is prevented from taking the undesirable bitter flavor which it otherwise would from the too-much-prolonged contact with the hops occurring in the apparatus heretofore generally used.

The apparatus described is relatively small in comparison with the tanks or jacks heretofore used and thus effects a very material saving in floor space. It may be placed in any convenient relation with the brewing kettle and coolers. For instance it may be placed so that the wort will flow by gravity from the kettle into the apparatus or the wort may be pumped into the apparatus and allowed to flow therefrom by gravity to the coolers.

What I claim is:

Apparatus of the character described, comprising a shell having suitable inflow and outflow connections for the beer or wort, a straining chamber conforming substantially to the shape of the shell and having smaller dimensions than the same to form a surrounding space at its sides and bottom between it and the shell, means on the shell for supporting said straining chamber therein, said means including ribs on the interior of the shell for holding the strainer against lateral displacement, and a valved discharge outlet at the top of the shell for discharging the air displaced from the shell by the beer or wort entering and filling the same.

ERNST UHLMANN.

Witnesses:
 OSCAR R. ERBEN,
 LEONARD A. ALVERSON.

Copies of this patent may be obtained for five cents each, by addressing the "Commissioner of Patents, Washington, D. C."